United States Patent [19]

Banning et al.

[11] Patent Number: 5,485,567
[45] Date of Patent: Jan. 16, 1996

[54] ICONIC TABLE OF DATABASE INFORMATION

[75] Inventors: Kenneth R. Banning; George P. Erwin-Grotsky; Shih-Gong Li; Alejandra Sanchez-Frank; Theodore Shrader, all of Austin, Tex.

[73] Assignee: International Business Machines Corporation, Armonk, N.Y.

[21] Appl. No.: 306,902

[22] Filed: Sep. 15, 1994

Related U.S. Application Data

[63] Continuation of Ser. No. 803,876, Dec. 9, 1991.

[51] Int. Cl.$^6$ ............................................. G06F 15/40
[52] U.S. Cl. ............................................. 395/148; 395/600
[58] Field of Search ................................ 395/148, 155, 395/159, 160, 161, 156, 157, 158, 12, 600

[56] References Cited

U.S. PATENT DOCUMENTS

| | | | |
|---|---|---|---|
| 4,813,013 | 3/1989 | Dunn | 364/900 |
| 4,859,187 | 8/1989 | Peterson | 434/118 |
| 5,040,131 | 8/1991 | Torres | 364/521 |
| 5,134,560 | 8/1992 | Ferriter et al. | 364/188 |
| 5,301,270 | 2/1993 | Steinberg et al. | 395/161 |

OTHER PUBLICATIONS

"A Database Model for User Interface Management Systems" Proceed of the 1990 Symposium on Applied Computing, pp. 200–201, Anderson et al., 6 Apr. 1990.
"Extending a Relational DBMS to Support Complex Objects" 2nd Intl. Conf on Data and Knowledge Sys. for Manuf. and Eng, pp. 131–171, Gardarin et al, 18 Oct. 1989.
"Adding Methods to Rel DB Constructs", Proceed of the 15th Ann. Intl. Conf., Tanaka et al., pp. 42–49, 13 Sep. 91.
"Extending SQL with General Transitive Closure and Extreme Value Selections" IEEE Transactions on Know. and Data Eng, pp. 381–390, Eder, J., Dec. 1990.
"A Visual Query Lang. for an ER Data Model", IEEE Computer Society Press, 1989 IEEE Workshop on Visual Lang. pp. 165–170, Czejdo et al. 6 Oct. 89.
"A Multimedia Knowledge–Baed System", IEEE Computer Soc. Press, Proceed of the 15th Annual Int Comp. Software & Appl. Conf. Sakaguchi et al, 13 Sep. 1991. pp. 118–123.
"Implementation of an OBJ–Orien Front–End to A Rel. Database Sys", IEEE TenCon '90, Kisword et al., pp. 811–815, vol. 2, 27 Sep. 1990.
"ESQL: a Query Lang. for the Relation Model Supporting Image Domains", Proceed 7th Intl. Conf. on Data Engineering, Ahad et al., pp. 550–559, 12 Apr. 1991.
"Toward a Multilevel Relational Data Language", IEEE Fourth Aerospace Computer Security Applications Conference, Lunt et al., pp. 72–79, Dec. 16, 1988.
Research Disclosure Mar. 1990, p. 211, Icons in the Headings of Columnar Lists.
Research Disclosure Nov. 1989, p. 837, Iconic Fields.

*Primary Examiner*—Robert W. Beausoliel, Jr.
*Assistant Examiner*—Stephen C. Elmore
*Attorney, Agent, or Firm*—Diana L. Roberts; Lawrence K. Stephens

[57] ABSTRACT

A method, system and program for displaying database information via a table containing icons and other summary information which clearly and concisely convey particular aspects of a database to a user. The table display acts as a window into a database when it is selected by a user. A user can also make changes to the database via the window of information.

7 Claims, 9 Drawing Sheets

FIG. 3
(a) ColumnList - a chained list
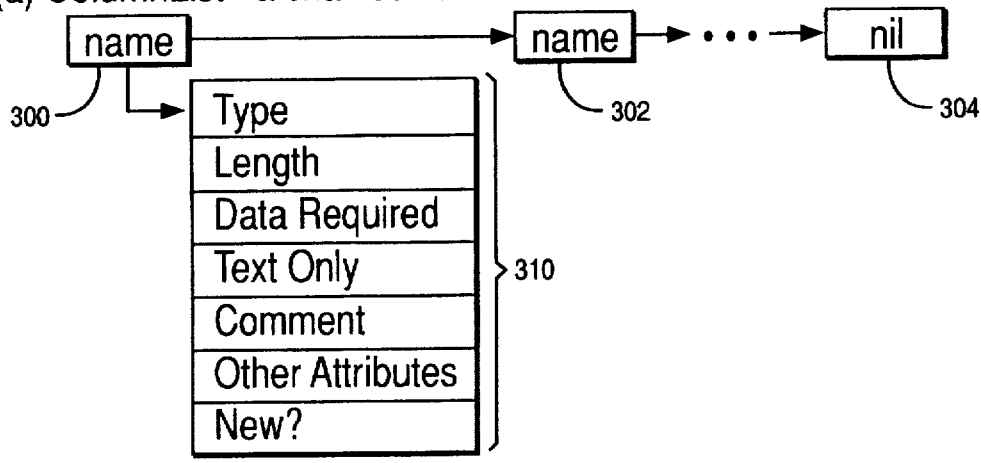
(b) IndexList - a chained list with chained arrays
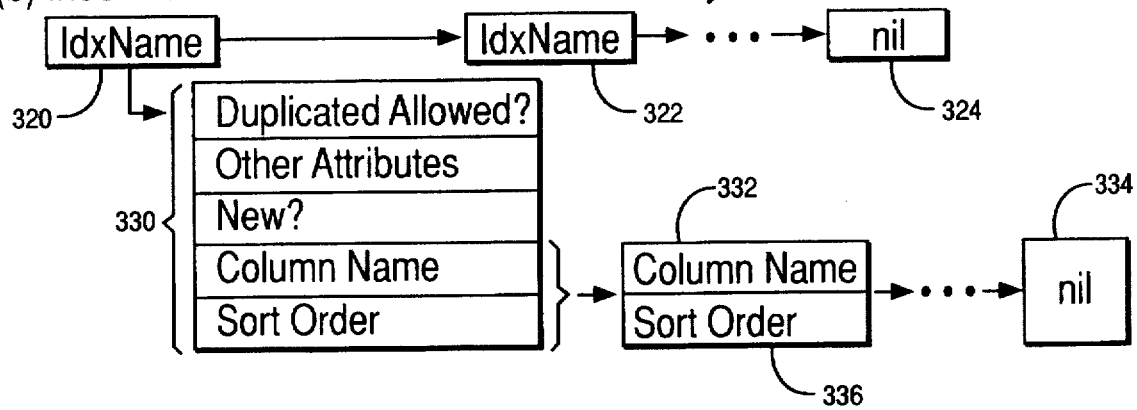
FIG. 4
(c) PrimaryKeyList - a list with chained elements
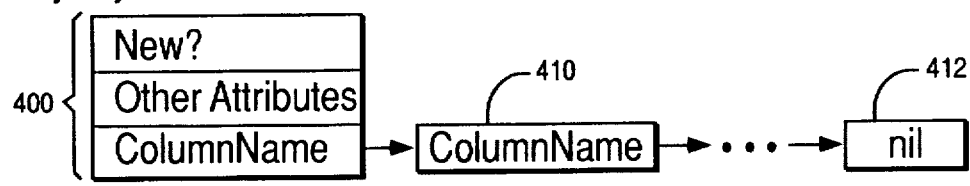
(d) ForeignKeyList - - a chained list with chained elements
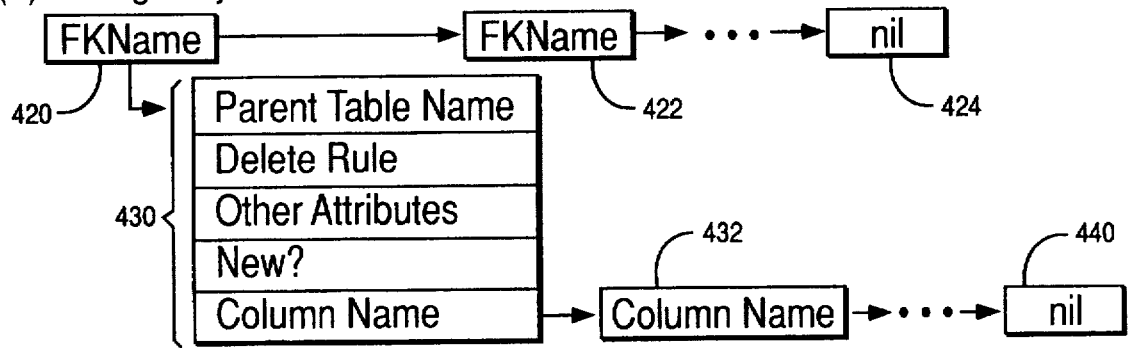

ICONIC TABLE OF DATABASE INFORMATION

This is a continuation of application Ser. No. 7/803,876 filed Dec. 9, 1991.

FIELD OF THE INVENTION

This invention generally relates to improvements in database applications and more particularly to providing concise, visual information concerning table columns and keys.

CROSS REFERENCE TO RELATED APPLICATIONS

Subject matter in the present application is related to the invention in U.S. patent application Ser. No. 07/803,875 filed Dec. 6, 1991 under the title "ICONIC REPRESENTATION FOR TABLE COLUMNS".

BACKGROUND OF THE INVENTION

Databases have become the subject of significant recent interest, not only because of the increasing volume of data being stored and retrieved by computerized databases but also by virtue of the data relationships which can be established during the storage and retrieval processes. Most of the interest in databases has concerned users demands for an improved ergonomic interface to the database through innovative display technology.

A recent innovation to improve the ergonomic interface to a knowledge-base system is disclosed in U.S. Pat. No. 4,813,013 to Dunn. The patent reveals an interactive, rule-based system which allows icons to be selectively tied to particular rule definitions. The stored rules are cross-referenced to the icon to which they pertain, so that whenever the icon is selected by a problem solving user for use in building a problem solution, the rules pertaining thereto are accessed and applied.

Research Disclosure, *Icons in the Headings of Columnar Lists*, March 1990 discloses another example of an ergonomic advance in user interfaces for databases. This disclosure discusses a facility to allow icons to appear in the heading area of a columnar list. For example, fields such as security level can have a header that is an icon and looks like a lock. Another Research Disclosure, *Iconic Fields*, November 1989, discloses icons that can be selectively opened to reveal detailed information concerning the field and its contents. Then, when the user has adjusted the detailed information, the field can be deselected and returned to an icon.

SUMMARY OF THE INVENTION

Accordingly, it is a primary object of the present invention to provide a user with a graphical, database interface employing icons and a row/column display to present information about a table and its contents; allow a user to manipulate information in the database via the icons; and employ the graphical interface as a window into the database.

These and other objects of the present invention are accomplished by the operation of an algorithm in the memory of a processor. The processor accesses data structures to determine the current status of a database table and displays the information stored in the database in a graphical display. The graphical display employs a table organized, iconic representation of selected information for table columns and keys. A user can also select an icon to open a dialog box of detailed information relating to the particular column or key. The dialog box enables the user to directly view or manipulate particular aspects of the database. The table organized, iconic representation provides concise, visual information indicating the relationships between columns and keys and visually coaches a user to select the appropriate information to satisfy the user's requirements.

BRIEF DESCRIPTION OF THE DRAWINGS

FIG. 3 depicts a set of data structures for creating a graphic display of information in accordance with the subject invention;

FIG. 4 depicts a set of data structures used to create a graphic display of information in accordance with the subject invention;

DETAILED DESCRIPTION OF THE INVENTION

Figure 1:
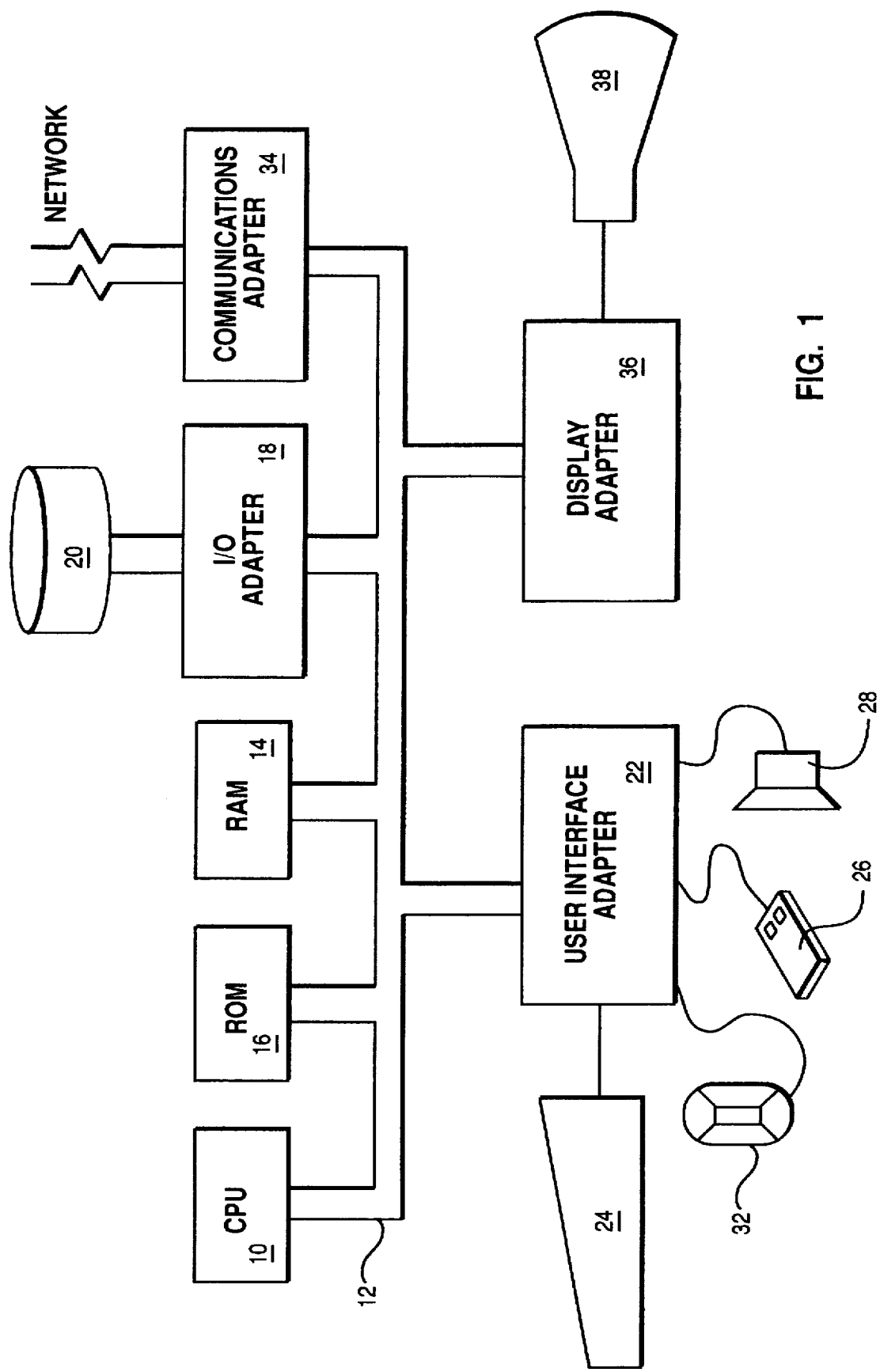
FIG. 1 is a block diagram of a personal computer system in accordance with the subject invention.

The invention is preferably practiced in the context of a relational database such as is available with Database Manager in the Extended Services (TM) software program available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

A control element (i.e. machine-readable medium) directs the operation of the workstation. Any suitable machine-readable medium may implement the control element, such as RAM 14, a magnetic diskette, magnetic tape, or optical disk (the last three being located in disk units 20). The graphical database interface of the present invention resides within the control element. The graphical database interface contains data structures and detailed logic (described herein), which are transmitted as "signals" recognizable by the workstation. These signals include signals which control the workstation to store data in a table, read data from the table and summarize the information by generating icons representing indices to the table, and display those icons and data in columns and rows on display device 38. The workstation has resident thereon the OS/2 base operating system and the aforementioned Database Manager relational database program. The invention further contemplates that pre-existing queries formulated in classical SQL format be conveyed to the workstation and subjected to conversion into visual or graphical, iconic information for display on a graphic display 38. The user thereafter interfaces to the database via the graphic display and dynamically views the results of any changes to the database information on the graphic display. The reader is referred to IBM's *SQL REFERENCE*, S04G-1012 (1991) for a detailed description of statements in the structured Query Language (SQL). The *SQL REFERENCE* is incorporated by reference in its entirety.

A database is a collection of information stored in a computer. The data is arranged as rows in tables, which represent groups of related information. A database may contain one or more tables. Structured Query Language (SQL) is an established set of statements that can be used to manage information that is stored in a database. By using these statements, a user can add, delete or update information in a table or request information from one or more tables in the form of a report. SQL performs operations on the tables to access the information within them without the user needing to know how the data is physically stored.

Referential integrity refers to the rules that govern some of the relationships within a database. Referential integrity is enabled by adding referential constraints to table and column definitions of a database. A referential constraint defines the rules for a relationship between a parent table and a dependent table. A parent table is the table containing the primary key that defines the relationships with a foreign key in another table. A table can be a parent in any number of relationships.

A primary key is a column or an ordered collection of columns whose values uniquely identify a row. To be unique, this collection of values cannot be duplicated in any other row. A primary key need not have a dependent foreign key.

A foreign key is one or more columns in a table whose values match the values of a primary key of a table. A foreign key is used to establish a relationship with a primary key for the purpose of enforcing referential integrity among tables. A referential constraint is an assertion that non-null values of a foreign key are valid only if they exist as values of the primary key in a parent table.

A dependent table is a table containing the foreign key that defines the relationship. A table can be a dependent in multiple relationships.

User interfaces for database tables typically shield users from a complete table definition at one time. Users are given specific subsets of the database information to view at a given time, such as column definitions or the primary key definition. The user is not given an effective method for drawing relationships between the columns and keys in the table without opening additional windows or panels.

The invention presents information about a database table in the form of icons and numbers. This gives the user a global sense of the structure of the various tables and helps to enhance understanding of the implications of dropping a key or deleting an uncommitted column. Columns are uncommitted if the table to which the column belongs has not been committed to the database or if the columns belongs to changes that were made to a table that has not been committed. Committed columns cannot be deleted from a database table.

Figure 2:
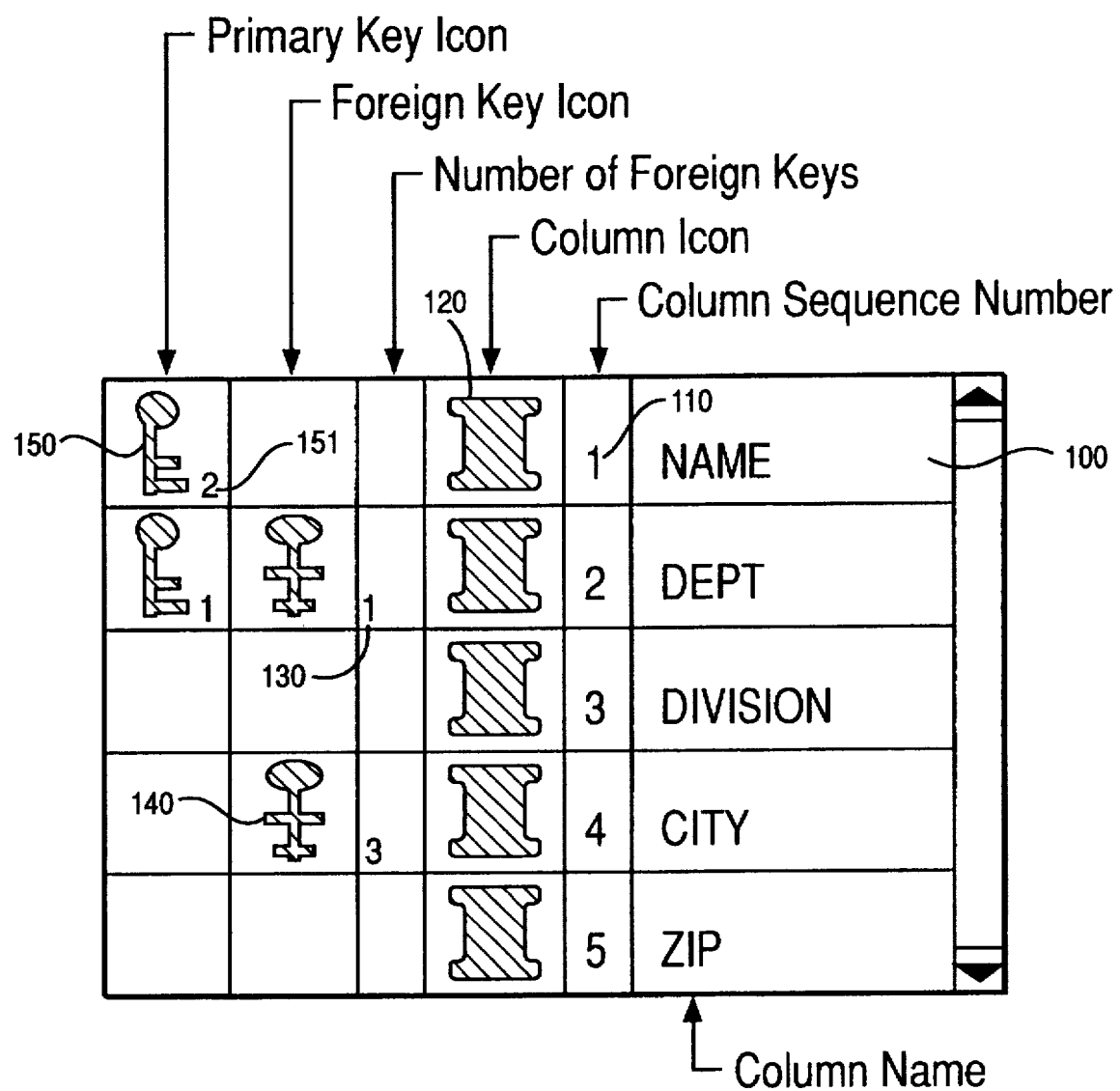
FIG. 2 schematically depicts a graphic display of database table information in rows and columns employing icons and alphanumeric information in accordance with the subject invention.

The invention presents the user with a list of column names in a single column format as depicted in FIG. 2, or in a matrix format at the discretion of the user. The primary key icon is presented in the first column 150 along with the sequence number of the column in the primary key as a subscript in the lower right hand corner 151. If a primary key has been defined that includes a particular column name 100, then an icon representing a key 150 appears in the column corresponding to the particular column name. Similarly, if a foreign key has been defined that includes a particular column name 100, then an icon representing a foreign key 140 is included in the corresponding column associated with the foreign key for the particular column name. If no foreign key has been defined for a particular column name, then the corresponding entry for the foreign key will be left blank.

The next entry, a number entered at 130, represents the number of foreign keys that have been defined for the table that include that particular column name. Since the number one appears in the column at 130, one foreign key exists that includes the column named DEPT. The column icon 120 appears in the next column. Then, in the next column, the columns sequence number 110 appears. This number corresponds to the order of the column names in the particular table. Finally, the column name 100 appears in the last column.

The icons used in FIG. 2 are for representation only. Other icon shapes or sizes may be used. Every column has a column icon 120 and a column sequence number 110. Since a column can be part of more than one foreign key, the number of foreign keys 130 to which a column belongs is a separate entry. The primary and foreign key icons are easily distinguishable from each other by their shape and color. The tabular approach makes it easy for a user to scan the display and readily assess the characteristics of a particular table.

The invention also allows a user to view the details concerning the definitions of a table by double-clicking on a particular icon with a mouse button. For example, if a user positions the cursor over a particular column icon 120, and double-clicks the mouse button, then a dialog box appears with detailed information relation to the column. Similarly, double-clicking on a primary key icon initiates a dialog box containing a list of the columns in the primary key. Double-clicking on a foreign key icon or the number associated with the icon brings up a list of the foreign keys to which the column belongs. A user selects a particular foreign key from the list to initiate a dialog with the specifics about the particular foreign key.

DETAILED LOGIC

The data structures and detailed logic in accordance with the subject invention is set forth commencing with FIG. 3. A set of data structures are used to organize the information utilized for the subject invention. The first of the data structures is called ColumnList 300. Each entry in ColumnList has a unique name 300 and fields descriptive of the particular column 310. The column names are chained together as indicated at 300, 302, . . . 304 until a nil pointer 304 is encountered.

The second data structure is called IndexList 320. The IndexList is a collection of index names and information associated with each of the index names 330. The information includes chained arrays of column names 332, ... 334 including the order that the columns are sorted in 336. Indexes can also be represented as icons since there can be more than one index per table in the database. Thus, the index would have a unique icon like the foreign key icon shown in FIG. 2 and a number of indexes that this column belongs to.

The third data structure is called PrimaryKeyList 400 in FIG. 4. The data structure contains a list of chained elements defining the primary key and the columns that are associated with the key 410, ... 412. ForeignKeyList 420 is another data structure containing ForeignKey names 420, 422, ... 424 and information associated with the names 430. The information associated with the names includes a chained list of ColumnNames 432, ... 440 associated with the particular ForeignKeyName 420.

Figure 5:
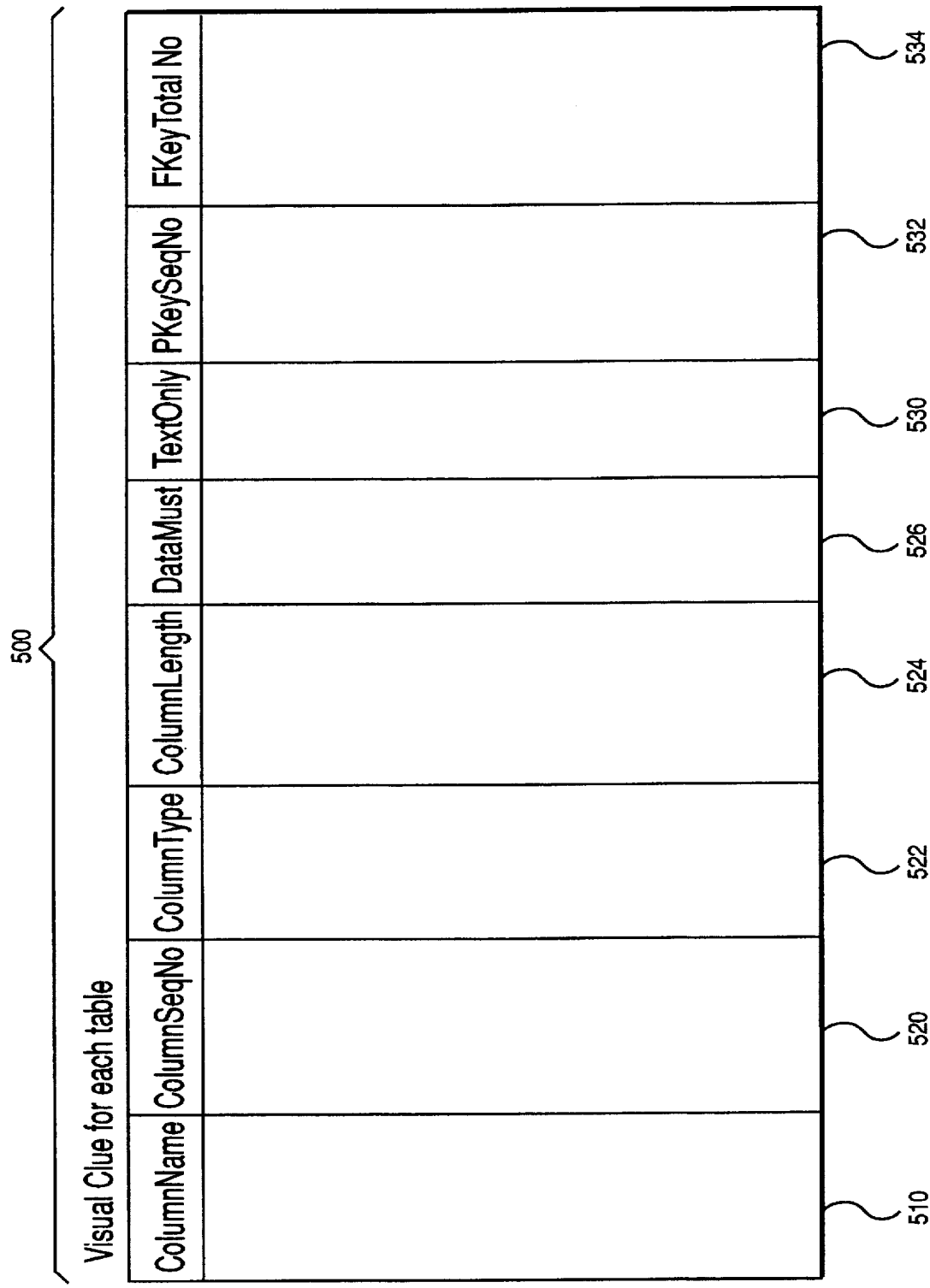
FIG. 5 schematically depicts a data structure used to create a graphic display of database information in accordance with the subject invention.

FIG. 5 is an example of a VisualClue data structure used to correlate information concerning a particular table in a database 500. Columns are provided for Column Names 510, Column Sequence Number 520, Column Type 522, Column Length 524, Data Must 526, Text Only 530, Primary Key Sequence number 532 and Foreign Key Total Number 534. The information is employed by the subject invention to relate various fields from an existing database into information that can be utilized for a concise display of pertinent information to a user.

The different types of icons in the subject invention visually indicate the sequence number of a particular column in the primary key definition (if the column is used for defining a primary key), if a particular column is used in a foreign key definition, the number of foreign key definitions in which a particular column is involved, and the sequence number of a particular column in the table definition. Each entry in the VisualClue data structure 500 of FIG. 5 describes a column of a specific database table. ColumnName 510, ColumnSeqNo 520, ColumnType 522, ColumnLength 524, DataMust 526 and TextOnly 530 can be retrieved directly from the data structure. PKeySeqNo 532 is the sequence number of a particular column in the primary key definition. If the particular column is not specified in the primary key definition, then its PKeySeqNo entry will be set equal to a value of NULL. The determination of PKeySeqNo 532 for a particular column is determined by comparing its column name against the ColumnName(s) in the data structure PrimaryKeyList. FKeyTotalNo 534 is a value indicating the total number of foreign key definitions in which the particular column is involved.

Figure 6:
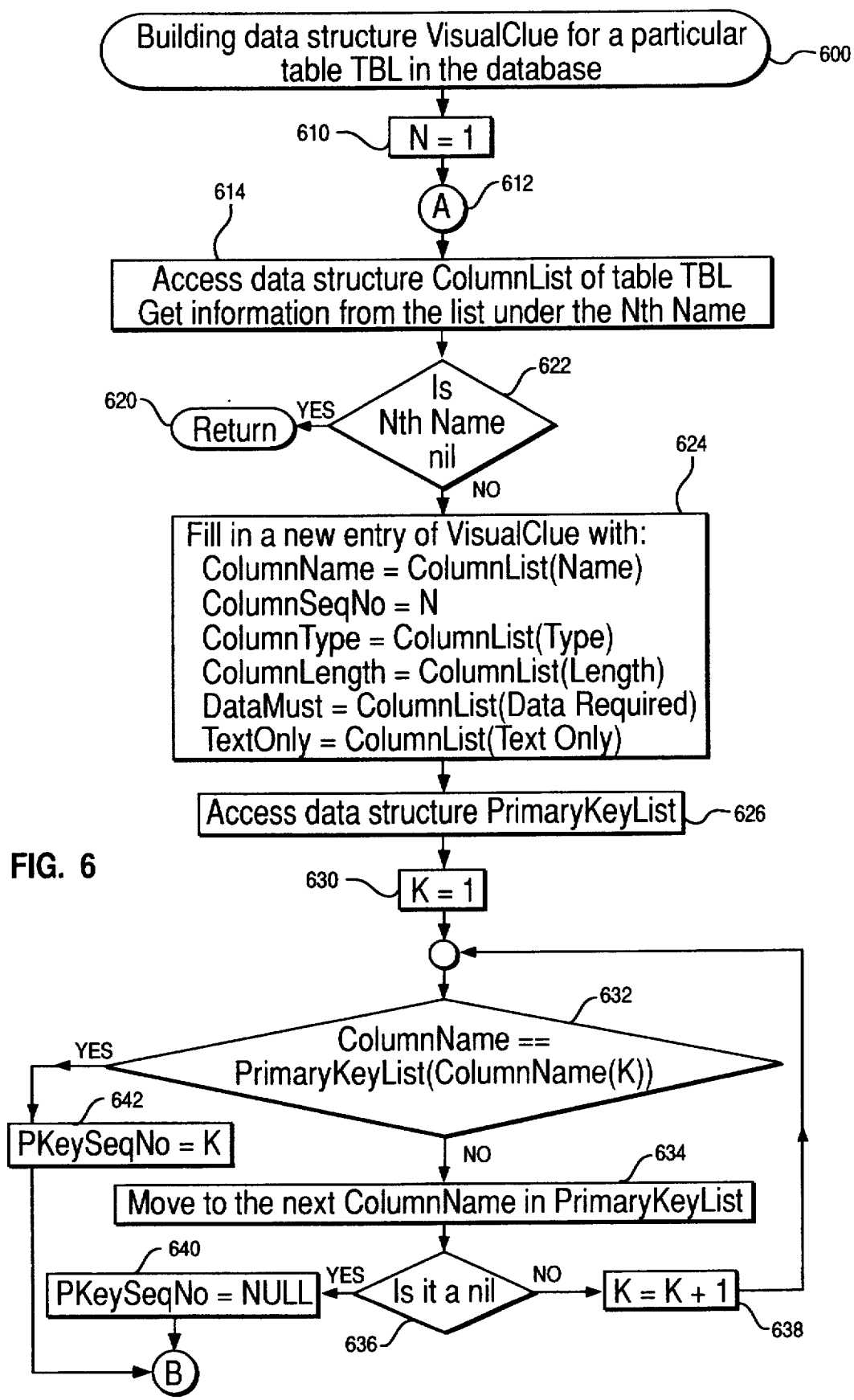
FIG. 6 is a flow diagram of the detailed logic in accordance with the subject invention.

FIG. 6 is the first flow chart setting forth the detailed logic in accordance with the subject invention. Control commences with a VisualClue data structure being opened for a particular table in an existing database as shown in function block 600 and an index N being initialized to one as shown in function block 610. A label 612 is necessary for later transfer of control logic. Then, at function block 614, N is used as an index into data structure ColumnList 300 of FIG. 3 to obtain information concerning the Nth Name in the ColumnList 300 data structure. If the Nth Name is equal to the nil value in decision block 622, then all of the items in the data structure have been processed and control is returned at terminal block 620.

If the Nth Name is not equal to the nil value in decision block 622, then as set forth in function block 624, a new entry is built in VisualClue utilizing the information from the ColumnList data structure for the Nth item. Thereafter, the PrimaryKeyList data structure 400 of FIG. 4 is accessed asset forth in function block 626 and another index K is initialized in function block 630. A test is performed in decision block 632 to determine if ColumnName is equal in value to the Kth ColumnName value in the PrimaryKeyList data structure. If the values match, then PKeySeqNo is set equal to the index K and control passes to FIG. 7. If the values do not match in decision block 632, then the next ColumnName in the PrimaryKeyList data structure 410 of FIG. 4 is obtained at function block 634 and examined to determine if it is equal in value to a nil at decision block 636. If it is not, then the index K is incremented at function block 638, and control passes to decision block 632. However, if the value is nil, then PKeySeqNo is set equal to zero at function block 640 and control is passed to FIG. 7.

Figure 7:
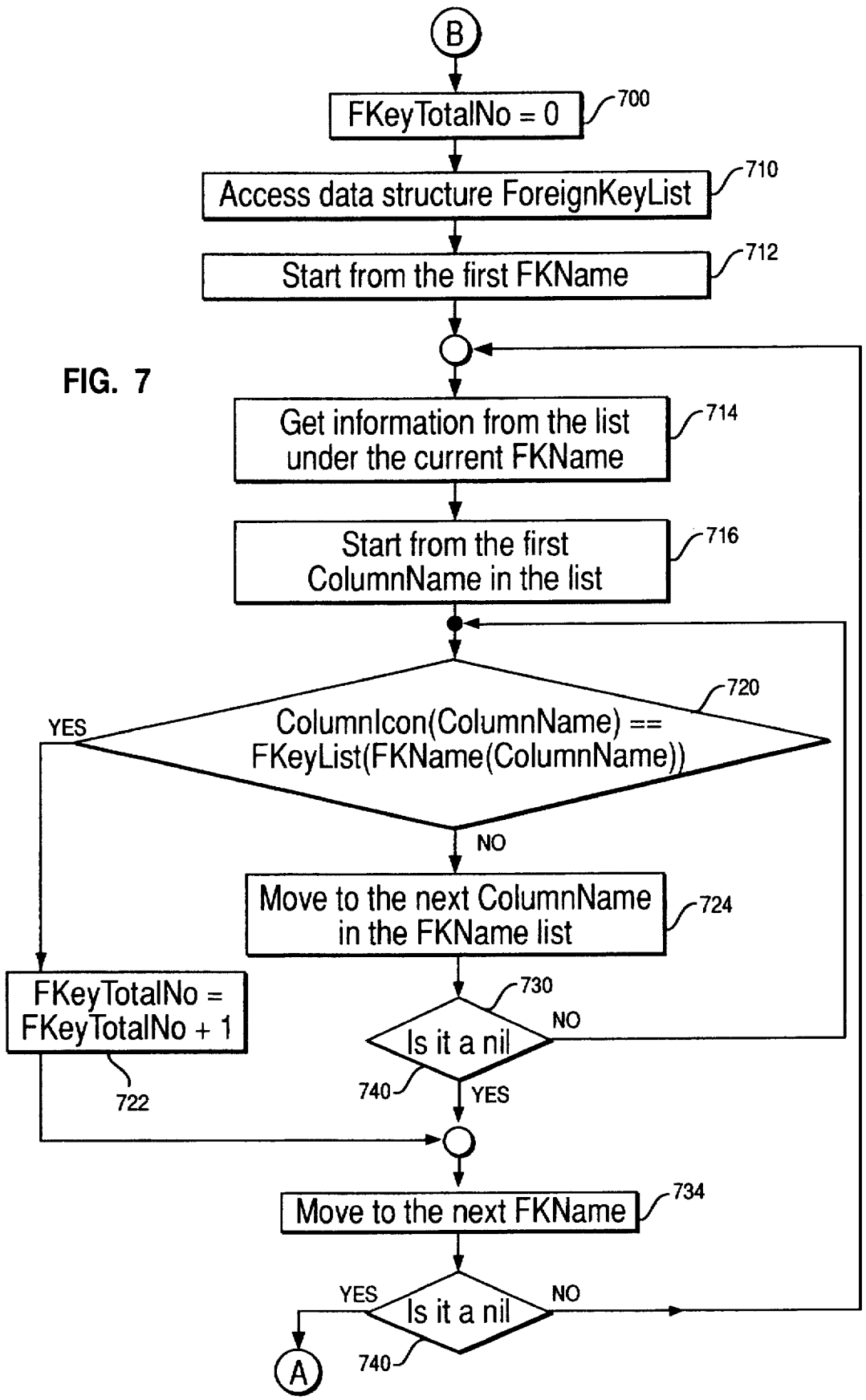
FIG. 7 is a flow diagram of the detailed logic in accordance with the subject invention.

FIG. 7 is a continuation of the flow logic commencing with FKeyTotalNo initialization to zero at function block 700. Then, the ForeignKeyList file corresponding to the data structure set forth in FIG. 4 at 420 is accessed at function block 710 and the first Foreign Key name is retrieved at function block 712. Then, information associated with the first Foreign Key name is retrieved at function blocks 714 and 716. A loop is commenced at decision block 720 to match the particular ColumnName. If the ColumnName is identified, then the Foreign Key totals are incremented to reflect the match at function block 722. The next Foreign Key Name is retrieved at function block 734, compared to the nil value at 740, and if it is not equal to nil (there are more foreign keys) control returns to function block 714 for processing the next Foreign Key value. If the nil value is detected, then control passes to label 612 of FIG. 6 for further processing.

If a match is not detected at decision block 720, then the next Column Name in the Foreign Key List chained list of names is retrieved. If the next name is not equal to a nil value, then control passes to decision block 720 for a match check. If the name value is nil, then the next Foreign Key Name is retrieved at function block 734 and if it is not equal to the nil value at decision block 740, then control passes to function block 714. If it is equal to the nil value, then control flows to label 612 of FIG. 6 for further processing.

Figure 8:
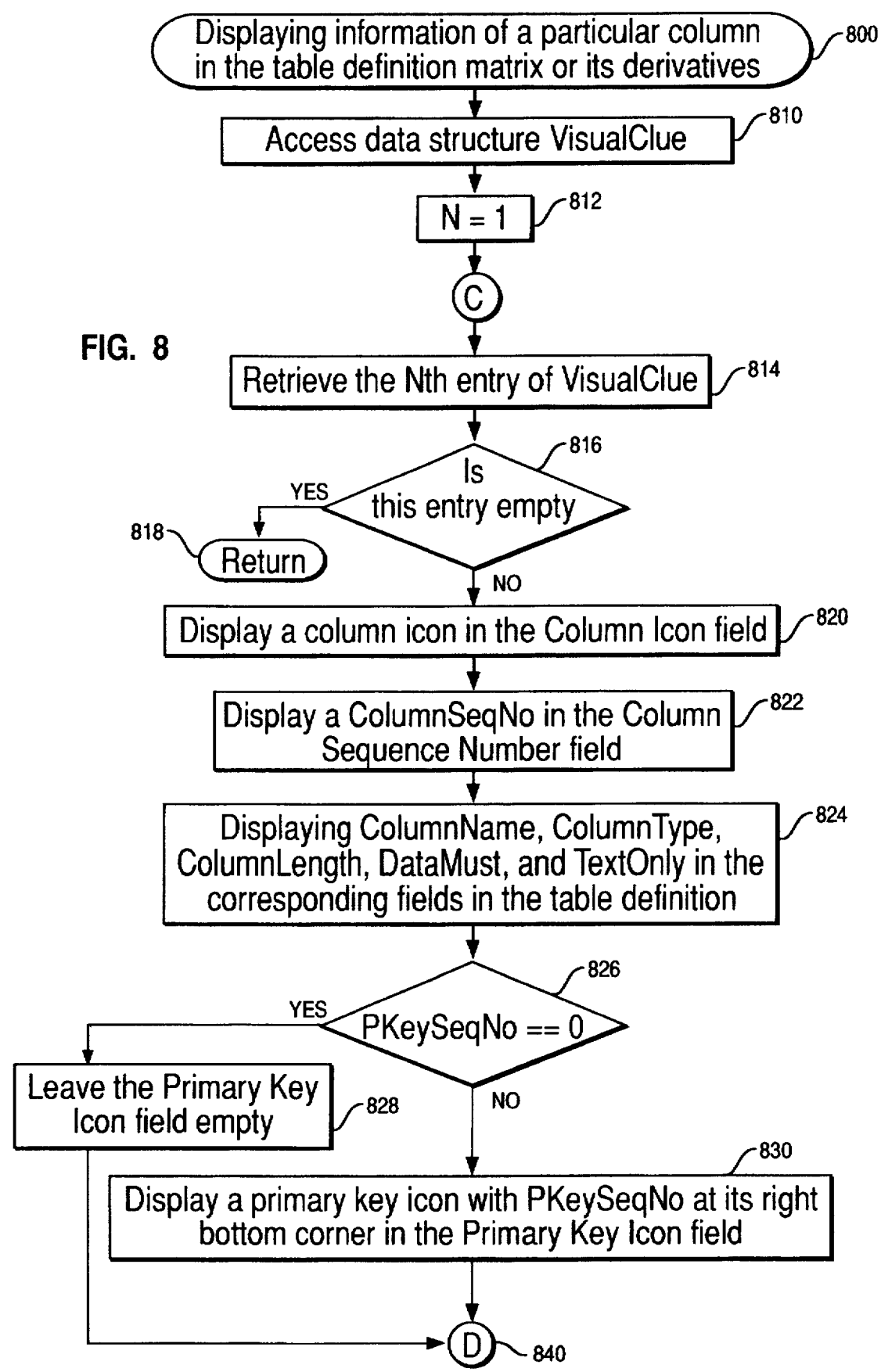
FIG. 8 is a flow diagram of the detailed logic in accordance with the subject invention.

FIG. 8 is a flowchart of the detailed logic in accordance with the subject invention. Control commences at 800 by displaying information concerning a particular column in the table definition matrix or its derivatives. This processing commences by accessing the VisualClue data structure 500 of FIG. 5 as set forth in function block 810. The N index is set to one at function block 812. Then, at function block 814, the Nth entry of the data structure is retrieved and a test is performed at decision block 816 to determine if the entry is empty or if has a value. If the entry is empty, then control returns at termination block 816.

However, if the entry is not empty, then a column icon is displayed in the column icon field on the display as indicated in function block 820, a column sequence number is displayed in the column sequence number field as indicated in function block 822 and a ColumnName, ColumnType, ColumnLength, DataMust and TextOnly entry are filled on the display in function block 824. Then, at decision block 826, a test is performed to determine if the PKeySeqNo has a value of zero. If it does, then the Primary Key Icon field is left empty on the display as indicated in function block 828 and control passes to function block 840. If it is not equal to zero, then a primary key icon is displayed with the value of PKeySeqNo displayed in subscript in the primary key icon field as set forth in function block 830 and control is passed via terminal 840 to FIG. 9.

Figure 9:
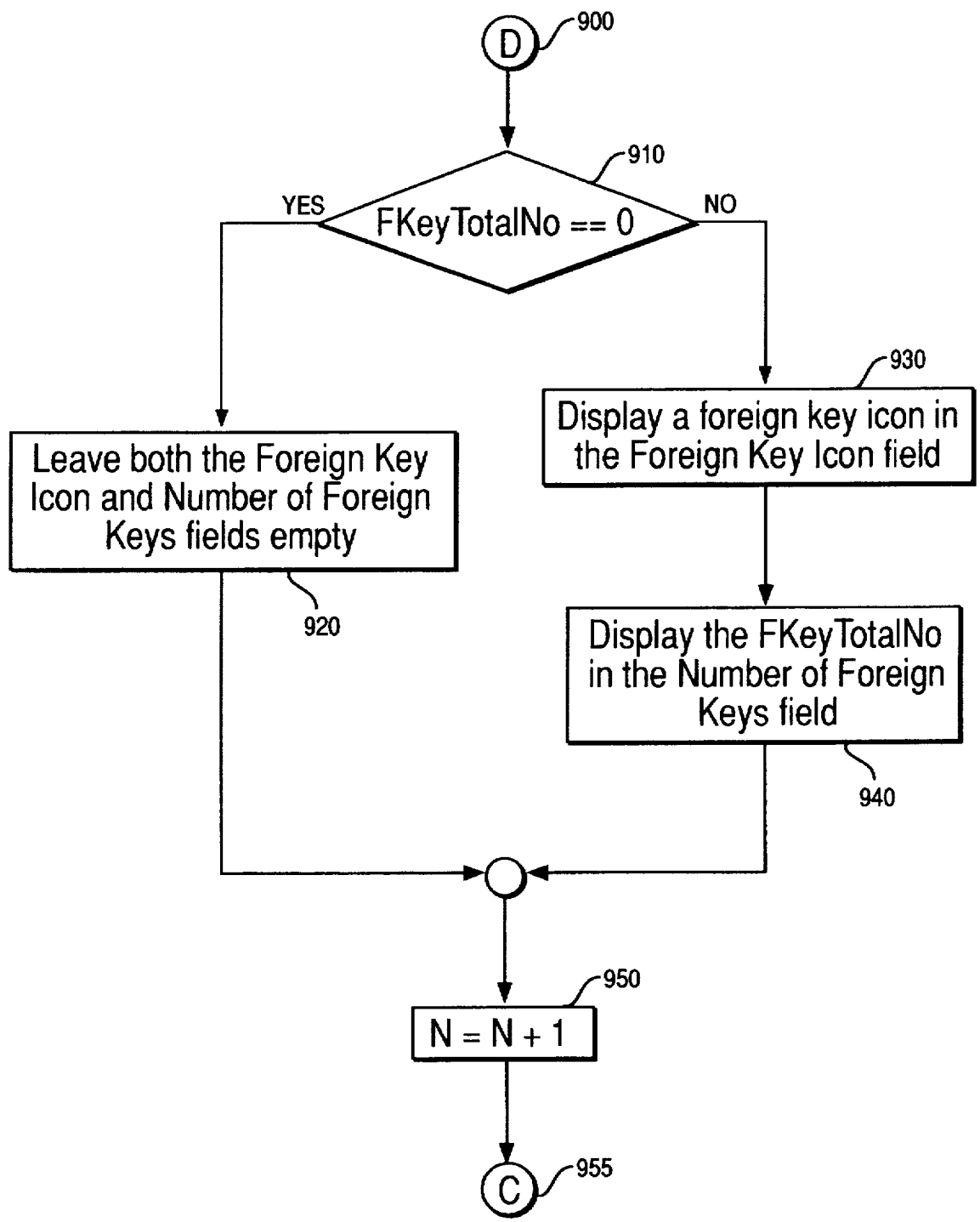
FIG. 9 is a flow diagram of the detailed logic in accordance with the subject invention.

FIG. 9 is the detailed logic associated with displaying the foreign key icon and the number of foreign keys field in accordance with the subject invention. Control commences at terminal 900 and an immediate test is performed at decision block 910 to determine if foreign key total number is equal to zero. If it is, then the foreign key icon and number of foreign keys field are left blank as shown in function block 920, the N index is incremented at function block 950 and control is returned to function block 814 of FIG. 8. If the number is not equal to zero in decision block 910, then a foreign key icon is displayed in the foreign key icon field as shown in function block 930, the number of foreign keys is displayed at function block 940, the N index is incremented and control is returned to function block 814 of FIG. 8.

Figure 10:
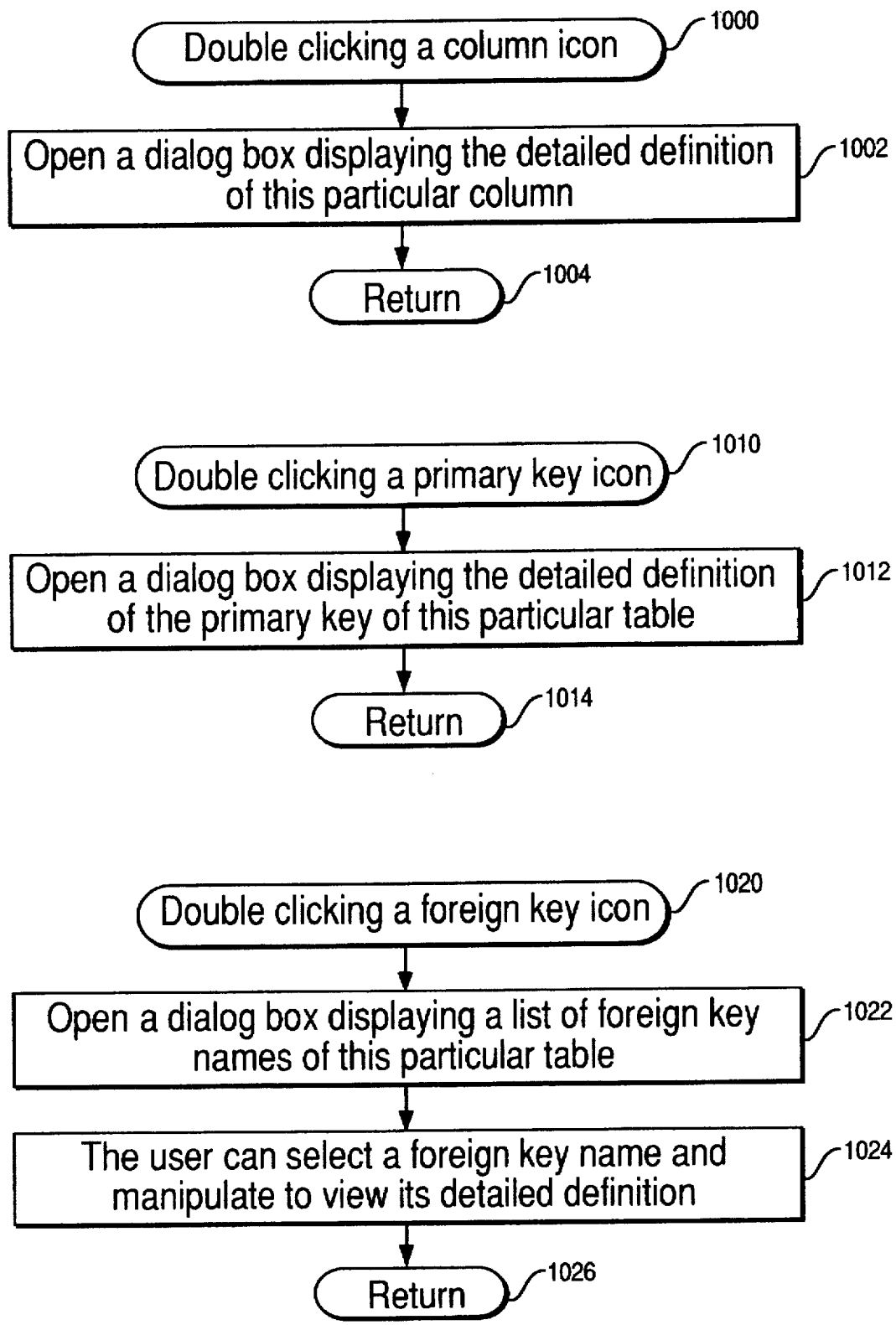
FIG. 10 is a flow diagram of the detailed logic in accordance with the subject invention.

FIG. 10 presents the detailed logic associated with double-clicking a mouse button at various locations on a display in accordance with the subject invention. Control commences at function block 1000 if double-click is detected on a column icon. Then, a dialog box is opened displaying the particular detailed definition of a column as indicated at function block 1002. Finally, control is returned to the application at terminal 1004. Control commences at function block 1010 if double-click is detected on a primary key icon. Then, a dialog box is opened displaying the particular detailed definition of a primary key as indicated at function block 1012. Finally, control is returned to the application at terminal 1014. Control commences at function block 1020 if double-click is detected on a foreign key icon. Then, a dialog box is opened displaying a list of the foreign key names for the particular table as indicated at function block 1022. The user can select a particular name that from the list to view its detailed definition as set forth in function block 1024. Finally, control is returned to the application at terminal 1026. One of ordinary skill in the art will readily comprehend that a user can change the information via a dialog box and have the changes made to the database if allowed by the database.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for graphically displaying on a display information of a plurality of vertical columns in at least one table of a database, comprising:

(a) means for accessing a data structure in memory containing the information for each of the columns and generating icons representative of the information, wherein at least one of the icons represents a primary key having values uniquely identifying a single horizontal row of the plurality of vertical columns in the table;

(b) means for displaying the icons on the display; and (c) means for placing alphanumeric representations of the information on the display, wherein at least one alphanumeric representation represents a number of the foreign keys that one of the columns belongs to.

2. An apparatus as recited in claim 1, wherein a second icon represents a foreign key.

3. An apparatus as recited in claim 1, wherein the icons change based on changes to the information.

4. An apparatus as recited in claim 1, including means for placing a second alphanumeric representation of the information on the display, wherein the second alphanumeric representation represents a column sequence number.

5. A method for graphically displaying information of a plurality of vertical columns of a database table on a display, comprising the steps of:

(a) accessing a data structure containing the information for each of the columns in the table and generating icons representative of the information, wherein at least one of the icons represents a primary key having values uniquely identifying a single horizontal row of the plurality of vertical columns in the table;

(b) displaying the icons on the display; and (c) placing alphanumeric representations of the information on the display, wherein at least one alphanumeric representation represents a number of the foreign keys that one of the column belongs to.

6. A method as recited in claim 5, including the step of changing the icons based on changes to the information.

7. A method as recited in claim 5, including the step of accessing information in the data structure and placing a second alphanumeric representation of the information on the display, wherein the second alphanumeric representation represents a column sequence number.

\* \* \* \* \*